United States Patent
Xing et al.

(10) Patent No.: US 11,424,500 B2
(45) Date of Patent: Aug. 23, 2022

(54) SECONDARY BATTERY, BATTERY MODULE, AND DEVICE USING SECONDARY BATTERY AS POWER SOURCE

(71) Applicant: Contemporary Amperex Technology Co., Limited, Ningde (CN)

(72) Inventors: Chengyou Xing, Ningde (CN); Chengdu Liang, Ningde (CN); Ningsheng Wu, Ningde (CN); Wenlong Kang, Ningde (CN); Peng Wang, Ningde (CN); Quankun Li, Ningde (CN); Lingyan Jiang, Ningde (CN)

(73) Assignee: Contemporain Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/120,593

(22) Filed: Dec. 14, 2020

(65) Prior Publication Data

US 2021/0376303 A1 Dec. 2, 2021

Related U.S. Application Data

(63) Continuation of application No. PCT/CN2020/108249, filed on Aug. 10, 2020.

(30) Foreign Application Priority Data

May 27, 2020 (CN) .......................... 202020916363.0

(51) Int. Cl.
*H01M 50/116* (2021.01)
(52) U.S. Cl.
CPC .................................. *H01M 50/116* (2021.01)
(58) Field of Classification Search
None
See application file for complete search history.

(56) References Cited

U.S. PATENT DOCUMENTS

2009/0186269 A1* 7/2009 Kim ..................... H01M 50/172
429/179
2011/0293973 A1* 12/2011 Kim ..................... H01M 50/147
429/53

(Continued)

FOREIGN PATENT DOCUMENTS

CN 2416613 Y 1/2001
CN 201017917 Y 2/2008

(Continued)

OTHER PUBLICATIONS

Cao et al. (CN110729421A)—machine translation.*

(Continued)

*Primary Examiner* — Haixia Zhang
(74) *Attorney, Agent, or Firm* — Law Offices of Liaoteng Wang

(57) ABSTRACT

The present disclosure relates to a secondary battery, a battery module, and a device using the secondary battery as a power source. The secondary battery includes a casing and a top cover for connecting with the casing. The casing includes an end portion provided with an opening. The top cover is used to cover the opening of the casing. The top cover includes an inserting portion extending into the casing from the opening. A plurality of notches are provided on an inner side of the end portion of the casing or on a side wall of the inserting portion facing the casing. In the secondary battery, the battery module, and the device using the secondary battery as a power source according to the present disclosure, the secondary battery can reduce the possibility of short circuit occurring in the electrode assembly and improve the operational safety of the secondary battery.

13 Claims, 9 Drawing Sheets

(56) References Cited

U.S. PATENT DOCUMENTS

2013/0302665 A1* 11/2013 Zhao .................. H01M 50/152
                                                              429/163
2018/0258740 A1    9/2018 Logan et al.

FOREIGN PATENT DOCUMENTS

| CN | 104218195 A  | 12/2014 |
|----|--------------|---------|
| CN | 110176558 A  | 8/2019  |
| CN | 110729421 A  | 1/2020  |
| CN | 210092146 U  | 2/2020  |
| CN | 210516782 U  | 5/2020  |
| JP | 2006332009 A | 12/2006 |

OTHER PUBLICATIONS

International Search Report for PCT/CN2020/108249 filed Aug. 10, 2020, dated Feb. 26, 2021, 10 pages.
The extended European Search Report for European Application No. 20820033.7 dated Oct. 20, 2021, 9 pages.
The First Office Action for European Application No. 20820033.7 dated Apr. 7, 2022, 4 pages.

* cited by examiner

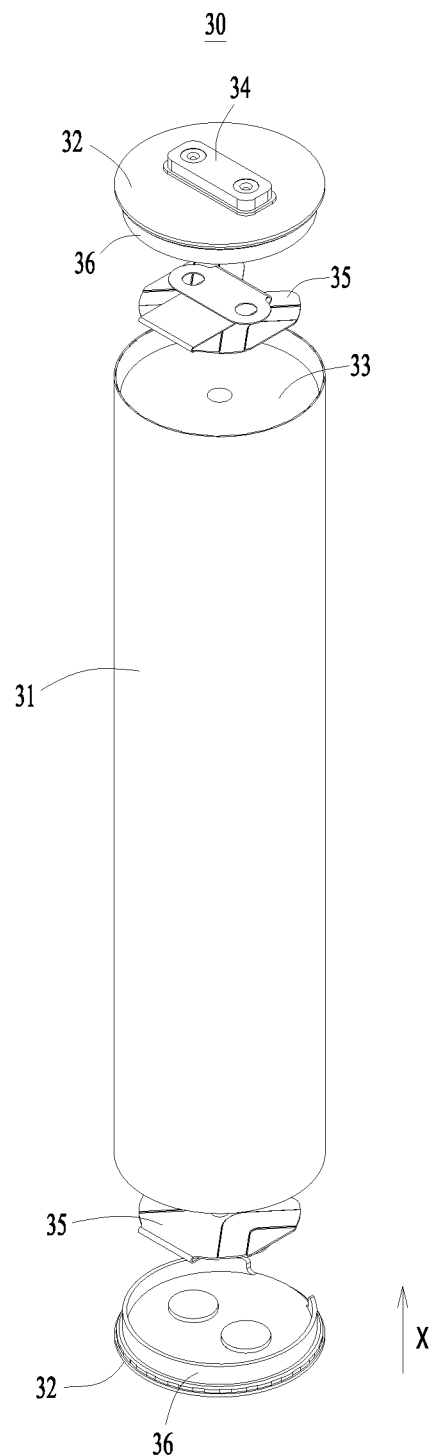
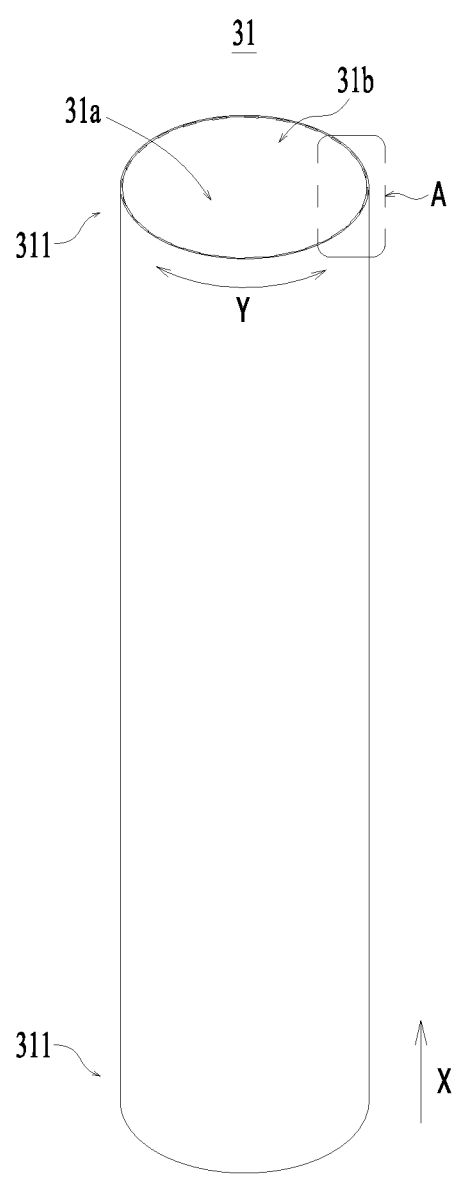
Fig. 4
Fig. 5

SECONDARY BATTERY, BATTERY MODULE, AND DEVICE USING SECONDARY BATTERY AS POWER SOURCE

CROSS-REFERENCE TO RELATED APPLICATION

This application is a continuation of International Application No. PCT/CN2020/108249, filed on Aug. 10, 2020, which claims priority from Chinese patent application No. 202020916363.0, entitled "SECONDARY BATTERY, BATTERY MODULE, AND DEVICE USING SECONDARY BATTERY AS POWER SOURCE", filed on May 27, 2020, both of which are incorporated herein by reference in their entireties.

TECHNICAL FIELD

The present disclosure relates to the technical field of battery, and in particular to a secondary battery, a battery module, and a device using the secondary battery as a power source.

BACKGROUND

With the development of science and technology, the rechargeable secondary batteries are more and more widely used in many applications, for example, the secondary batteries can be used in vehicles, electric bicycles, wireless electric tools, or the like. The secondary battery includes a casing and an electrode assembly enclosed within the casing. A plurality of secondary batteries are received in a housing, however, a problem of short circuit in the secondary battery may occur during the use of the secondary battery, affecting the operational safety of the secondary battery.

SUMMARY

The present disclosure provides a secondary battery, a battery module, and a device using the secondary battery as a power source. The secondary battery can reduce the possibility of short circuit occurring in the electrode assembly and improve the operational safety of the secondary battery.

In one aspect, the present disclosure provides a secondary battery including a casing and a top cover connected with the casing. The casing includes an end portion provided with an opening. The top cover is used to cover the opening of the casing. The top cover includes an inserting portion extending into the casing from the opening. A plurality of notches are provided on an inner side of the end portion of the casing or the side wall of the inserting portion facing the casing.

According to an embodiment of one aspect of the present disclosure, the secondary battery further includes an insulating member and an electrode assembly installed within the casing; the insulating member is installed on the top cover to isolate the top cover from the electrode assembly; a minimum thickness of the insulating member protruding out from the top cover along an axial direction of the opening is greater than a maximum distance between adjacent notches; and/or the minimum thickness of the insulating member protruding out from the top cover along the axial direction of the opening is greater than a maximum thickness of the inserting portion along the axial direction of the opening.

According to an embodiment of one aspect of the present disclosure, the insulating member includes a ring portion disposed around an edge of the inserting portion; the secondary battery further includes an insulating sheet for wrapping the electrode assembly, and the insulating sheet extends to a position between the ring portion and the casing.

According to an embodiment of one aspect of the present disclosure, at least part of the side wall of the inserting portion has a smooth curved surface or an inclined surface inclined toward a center of the opening.

According to an embodiment of one aspect of the present disclosure, the plurality of notches are in identical shape.

According to an embodiment of one aspect of the present disclosure, the plurality of notches are evenly arranged on the inserting portion or the end portion of the casing along a circumferential direction of the opening.

According to an embodiment of one aspect of the present disclosure, the top cover further includes a disc portion, and the inserting portion protrudes out from an end surface of the disc portion; an outer edge of the disc portion extends out from the inserting portion to connect and fix with the end portion.

According to an embodiment of one aspect of the present disclosure, the inserting portion includes an annular surface connected with the disc portion, the notches are disposed on a side of the annular surface away from the disc portion, and an orthographic projection of an end surface of the end portion along the radial direction of the opening falls within the annular surface.

According to an embodiment of one aspect of the present disclosure, the disc portion is sealingly connected with the end portion of the casing.

According to an embodiment of one aspect of the present disclosure, the disc portion and the end portion of the casing are connected and fixed by welding.

According to an embodiment of one aspect of the present disclosure, the notches are disposed on the inner side of the end portion, and a size of the notch along the axial direction of the opening is smaller than a thickness of the inserting portion inserted into the opening.

In the secondary battery according to the embodiment of the present disclosure, since the notches are disposed on the inner side of the end portion of the casing or the side wall, facing the casing, of the inserting portion of the top cover, the inserting portion of the top cover and the end portion of the casing are not prone to contact with each other at the notches, so that the region where the inserting portion of the top cover and the end portion of the casing come into contact and scratching becomes smaller. During the process of assembling the top cover and the casing, when the inserting portion of the top cover and the end portion of the casing are scratched at the contact region, the size of the formed wire-like metal debris falling off from inserting portion of the top cover or the casing can be smaller, or the possibility of producing larger-sized wire-like metal debris can be effectively reduced. In this way, a smaller number or smaller size of wire-like metal debris can be produced during the assembly process of the casing and the top cover, reducing effectively the possibility of short circuit occurring at the first electrode plate and the second electrode plate of the secondary battery due to overlapping with the wire-like metal debris, and improving the operational safety of the secondary battery.

In another aspect, the present disclosure provides a battery module including a housing and the secondary battery described as above, the secondary battery being disposed within the housing.

In still another aspect, the present disclosure provides a device using a secondary battery as a power source, including the secondary battery as described above, the secondary battery being used to provide electrical energy.

DESCRIPTION OF THE DRAWINGS

The features, advantages, and technical effects of the exemplary embodiments of the present disclosure will be described below with reference to the drawings.

FIG. 4 is a schematic exploded structure view of a secondary battery disclosed according to an embodiment of the present disclosure;

FIG. 5 is a schematic structure view of a casing disclosed according to an embodiment of the present disclosure;

Figure 1:
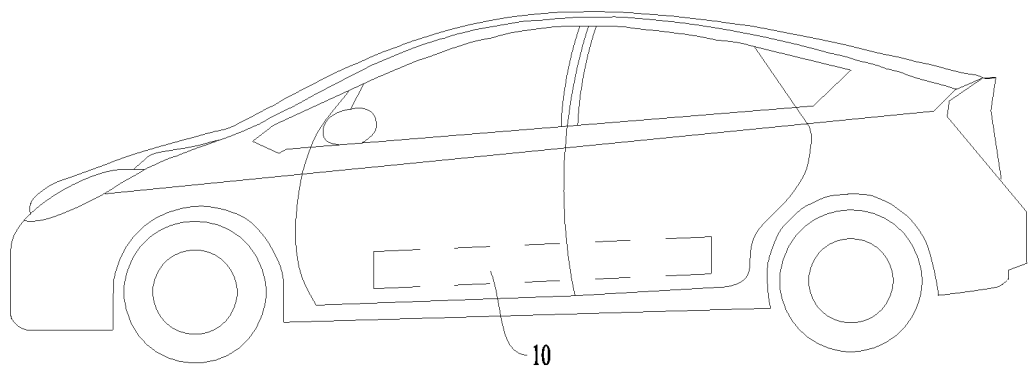
FIG. 1 is a schematic structure view of a vehicle disclosed according to an embodiment of the present disclosure.

In the drawings, the figures are not drawn to actual scale.

DESCRIPTION OF REFERENCE NUMERALS

1: vehicle;
10: battery module;
20: housing;
30: secondary battery; 31: casing; 31*a*: receiving hole; 31*b*: opening; 311: end portion; 311*a*: end surface; 32: top cover; 321: inserting portion; 3211: side wall; 3212: annular surface; 322: disc portion; 33: electrode assembly; 34: electrode terminal; 35: connecting component; 36: insulating member; 361: ring portion; 37: insulating sheet;
40: insulating isolation member;
50: upper cover body;
60: lower cover body;
99: notch;
X: axial direction; Y: circumferential direction.

DETAILED DESCRIPTION

The implementations of the present disclosure are described in further detail below with reference to the accompanying drawings and embodiments. The detailed description of the following embodiments and drawings are used to exemplarily illustrate the principle of the present disclosure, rather than to limit the scope of the present disclosure. That is to say, the present disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second", "third" and the like are only used for descriptive purposes, and should not be interpreted as indicating or implying relative importance. "Perpendicular" is not strictly perpendicular, but can fall within the allowable error range. "Parallel" is not strictly parallel, but can fall within the allowable error range.

The orientation terms appearing in the following description refer to the directions shown in the drawings, and are not intended to limit the specific structure of the present disclosure. In the description of the present disclosure, it should also be stated, unless otherwise specified and limited, the terms "installed", "connected with", and "connected to" should be understood in a broad sense. For example, a connection may refer to fixed connection or disassembly connection; or may refer to integral connection; or may refer to direct connection or indirect connection through an intermediate medium. For the ordinary person skilled in the art, the specific meanings of the above terms in the present disclosure may be understood according to specific situations.

When solving the problem of short circuit existing in the secondary battery in the prior art, the inventors conducted research and analysis on various structures of the secondary battery, and found that there would remain wire-like metal debris inside the secondary battery after the assembly of the secondary battery was completed. The wire-like metal debris may cause an occurrence of short circuit in the secondary battery. The inventors optimized the processing and manufacturing procedures and assembly environment of various components of the secondary battery, in order to reduce the possibility of production of metal debris. However, there is still a short-circuit phenomenon in the secondary battery, and the proportion of secondary batteries that have such problem is not significantly decreased. The inventors further analyzed and studied the assembly procedures of the secondary battery. In the end, the inventors found that the wire-like metal debris is prone to be produced at the top cover and the casing of the secondary battery during the assembly process. During the assembly process of the top cover and the casing, there is a case where the top cover may scratch an inner wall of the casing and/or the casing may scratch an outer wall of the top cover, and the wire-like metal debris may be produced when the two are scratched with each other. Since the wire-like metal debris is relatively long in size, it is easy to cause an occurrence of short circuit in the assembled secondary battery.

In view of the above-mentioned problems found by the inventors, the inventors improved the structure of the secondary battery, the embodiments of the present disclosure will be further described below.

In order to better understand the present disclosure, the present disclosure will be described below with reference to FIGS. 1 to 11.

With Reference to FIG. 1, an embodiment of the present disclosure provides a device using a battery module as a power source. The device may be, but is not limited to, a vehicle, a ship, an aircraft, an electric tool, or the like. One embodiment of the present disclosure provides a vehicle 1, which includes a vehicle body and a battery module 10. The battery module 10 is disposed on the vehicle body. The vehicle 1 may be a pure electric vehicle, a hybrid vehicle or an extended-range vehicle. The vehicle body is provided with a drive motor electrically connected with the battery module 10. The battery module 10 provides electrical energy to the drive motor. The drive motor is connected with the wheels on the vehicle body by a transmission mechanism, thereby driving the vehicle to travel. Optionally, the battery module 10 may be horizontally disposed at a bottom of the vehicle body.

Figure 2:
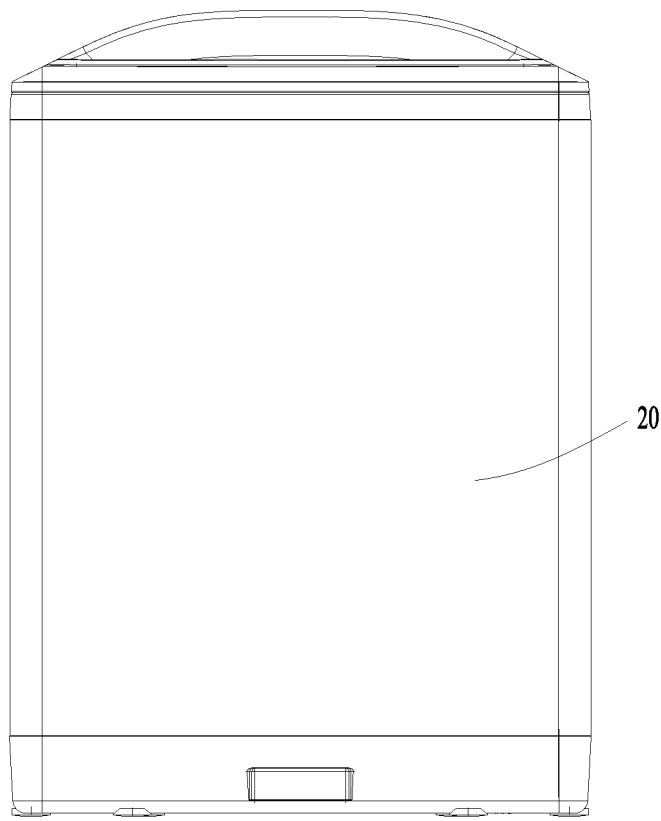
FIG. 2 is a schematic structure view of a battery module disclosed according to an embodiment of the present disclosure.
Figure 3:
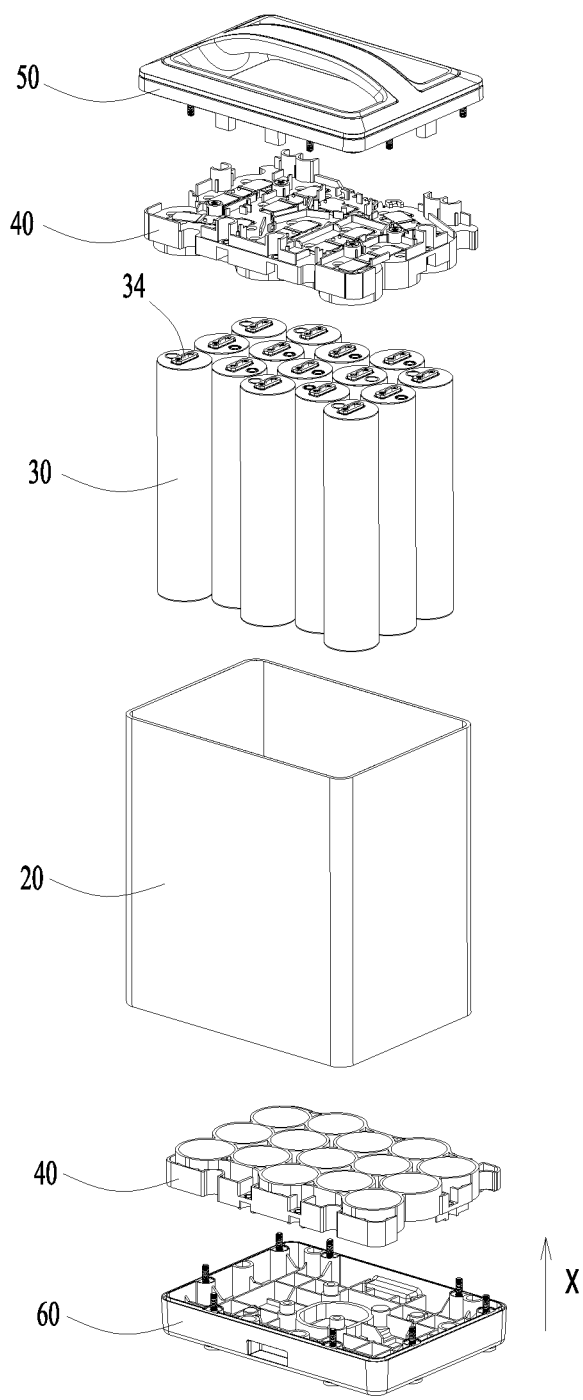
FIG. 3 is a schematic exploded structure view of the battery module in the embodiment shown in FIG. 2.
Figure 6:
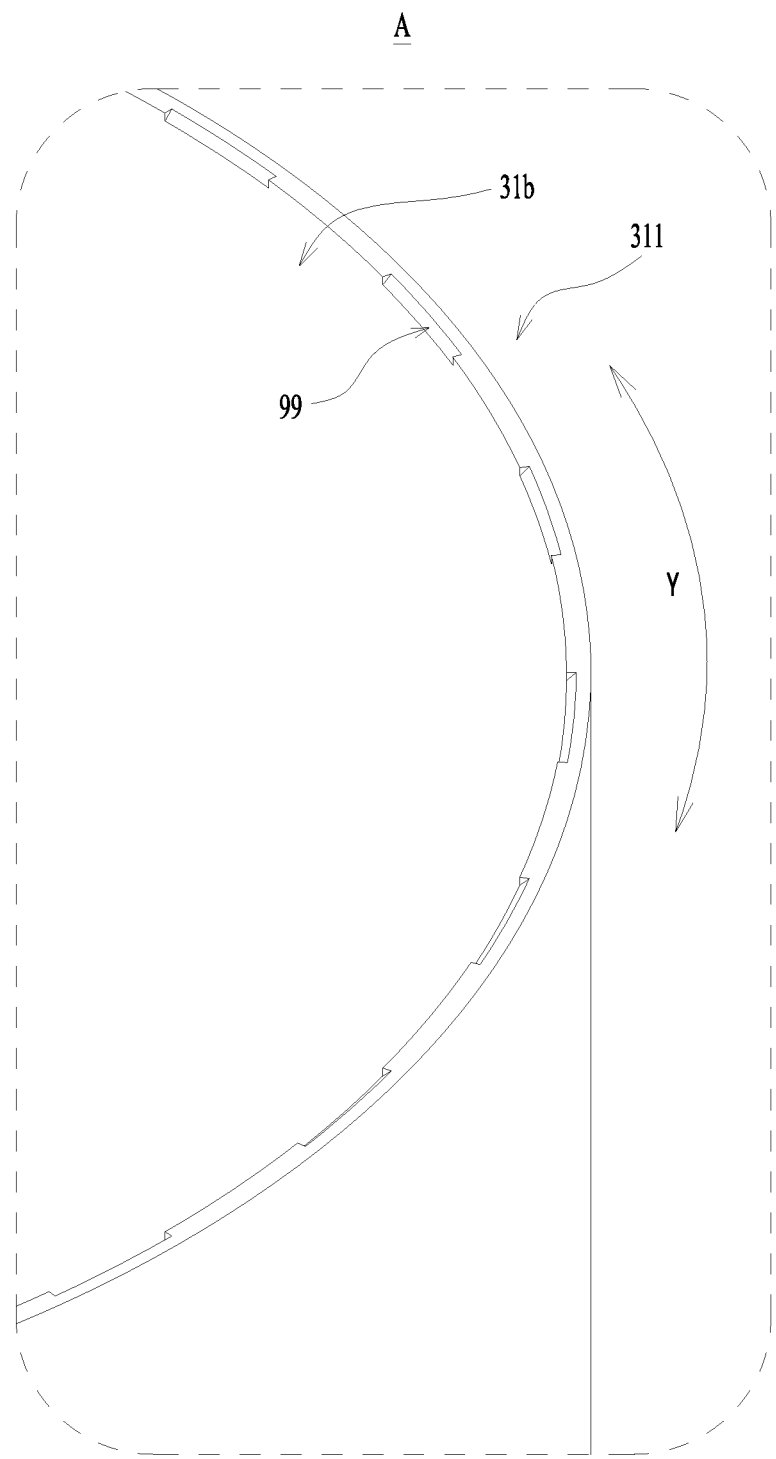
FIG. 6 is an enlarged view of portion A in FIG. 5.

In an embodiment of the present disclosure, with reference to FIGS. 2 and 3, the battery module 10 includes a housing 20, a secondary battery 30, an insulating isolation member 40, an upper cover 50 and a lower cover 60. The number of the secondary battery 30 disposed within the housing 20 may be plural. The plurality of secondary batteries 30 may be connected in series or in parallel with each other by busbar components. The housing 20 has a cylindrical structure with two opposite openings. The secondary battery 30 may be fitted into the housing 20 through one of the openings. The upper cover 50 and the lower cover 60 are respectively disposed at two opposite ends of the housing 20 and enclose the corresponding openings. The insulating isolation member(s) 40 is/are provided between the upper cover 50 and the secondary battery 30 or/and between the lower cover 60 and the secondary battery 30. Optionally, the insulating isolation members 40 are respectively provided between the upper cover 50 and the secondary battery 30 and between the lower cover 60 and the secondary battery 30. Two insulating isolation members 40 are disposed at intervals in an axial direction of the secondary battery 30. The two insulating isolation members 40 are respectively disposed corresponding to two end portions of the secondary battery 30 and can press the secondary battery 30 tightly along the axial direction by the end portions, thereby restricting the positional movement of the secondary battery 30 in the axial direction. The insulating isolation member 40 can insulate and isolate the secondary battery 30 from other adjacent structural members, such as busbar components, circuit boards, wiring harnesses, or the like, so as to improve the operational safety of the secondary battery 30. In one example, the insulating isolation member 40 has an integral injection molding structure. As shown in FIG. 2, the housing 20 according to the embodiment of the present disclosure has a square structure or is in other shape. The housing 20 may be made of material such as aluminum, aluminum alloy, plastic, or the like.

As shown in FIG. 4, the secondary battery 30 includes a casing 31, an electrode assembly 33 disposed within the casing 31, a top cover 32 sealingly connected with the casing 31, an electrode terminal 34 disposed on the top cover 32, and an connecting component 35.

As shown in FIG. 5, the casing 31 according to an embodiment of the present disclosure has a receiving hole 31a for receiving the electrode assembly 33 and an opening 31b that is in communication with the receiving hole 31a. The casing 31 has two opposite end portions 311. The opening 31b of the casing 31 is disposed at the end portion 311. In one example, the casing 31 has a cylindrical structure with one end portion open or a cylindrical structure with two end portions open. It can be understood, the casing 31 may also be in shape of square or in other shape. The casing 31 may be made of material such as aluminum, aluminum alloy, or the like.

A main body of the electrode assembly 33 according to the embodiment of the present disclosure may be formed by winding a first electrode plate, a second electrode plate, and a separator located between the first electrode plate and the second electrode plate together, wherein the separator is an insulator sandwiched between the first electrode plate and the second electrode plate. In this embodiment, the first electrode plate is exemplified as a positive electrode plate, and the second electrode plate is exemplified as a negative electrode plate. A positive-electrode-plate active material is coated on a coating region of the positive electrode plate, and a negative-electrode-plate active material is coated on a coating region of the negative electrode plate. A plurality of uncoated regions extending out from the coating regions of the main body serve as tabs. The electrode assembly 33 includes two tabs, i.e., a positive tab and a negative tab. The positive tab extends out from the coating region of the positive electrode plate, and the negative tab extends out from the coating region of the negative electrode plate. In the embodiment of the present disclosure, one tab respectively extends out from each of both ends of the main body. The tabs having the same polarity are connected with the electrode terminal 34 by the connecting component 35.

Figure 7:
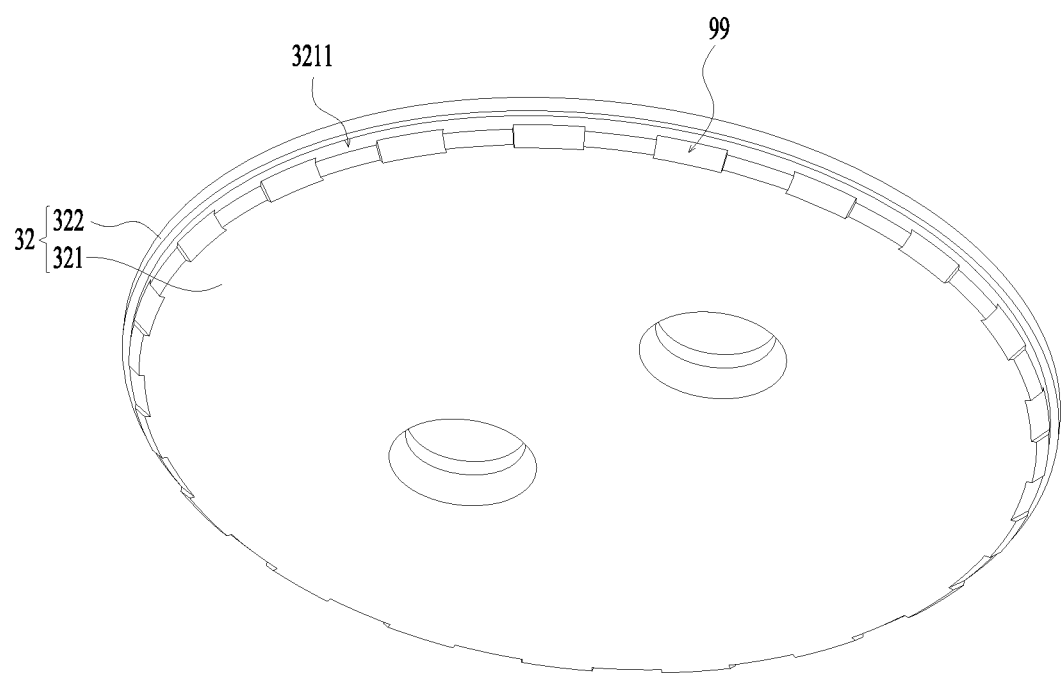
FIG. 7 is a schematic structure view of a top cover disclosed according to an embodiment of the present disclosure.

The top cover 32 according to the embodiment of the present disclosure is used to cover the opening 31b of the casing 31. With reference to FIG. 7, the top cover 32 includes an inserting portion 321 for extending into the casing 31 from the opening 31b of the casing 31. When the top cover 32 and the casing 31 are assembled, the inserting portion 321 of the top cover 32 is required to be inserted into the casing 31. The inserting portion 321 has a side wall 3211 facing an inner wall of the casing 31. The top cover 32 has an electrode lead-out hole (not shown in the figure). The electrode terminal 34 covers the electrode lead-out hole and is connected with the top cover 32. In the embodiment of the present disclosure, with reference to FIG. 6, a plurality of notches 99 are provided on an inner side of the end portion 311 of the casing 31. Alternatively, with reference to FIG. 7, a plurality of notches 99 are provided on the side wall 3211, facing the casing 31, of the inserting portion 321 of the top cover 32. In this way, an inner edge of the end portion 311 of the casing 31 or an edge of the inserting portion 321 of the top cover 32 has a discontinuous toothed edge structure. One tooth portion is formed between two adjacent notches 99.

In the secondary battery 30 according to the embodiment of the present disclosure, since the notches 99 are provided on the inner side of the end portion 311 of the casing 31 or on the side wall 3211, facing the casing 31, of the inserting portion 321 of the top cover 32, the inserting portion 321 of the top cover 32 and the end portion 311 of the casing 31 are not prone to contact with each other at the notches 99, so that the region where the inserting portion 321 of the top cover 32 and the end portion 311 of the casing 31 come into contact and scratching becomes smaller. During the assembly process of the top cover 32 and the casing 31, when the inserting portion 321 of the top cover 32 and the end portion 311 of the casing 31 are scratched at the contact region, the size of the formed wire-like metal debris falling off from inserting portion 321 of the top cover 32 or the casing 31 can be smaller, or the possibility of producing larger-sized wire-like metal debris can be effectively reduced. In this way, a smaller number or smaller size of wire-like metal debris can be produced during the assembly process of the casing 31 and the top cover 32, reducing effectively the possibility of short circuit occurring at the first electrode plate and the second electrode plate of the secondary battery 30 due to overlapping with the wire-like metal debris, and improving the operational safety of the secondary battery 30.

In one embodiment, as shown in FIG. 7, at least part of the side wall 3211 of the inserting portion 321 has a smooth curved surface or an inclined surface inclined toward a center of the opening 31b, so that the sharpness of the at least part of the side wall 3211 of the inserting portion 321 can be reduced, decreasing beneficially the scratching stress of the side wall 3211 of the inserting portion 321 to the inner wall of the casing 31, and reducing the possibility of producing wire-like metal debris due to scratch resulting from contact between the inserting portion 321 and the casing 31.

In one embodiment, the notches 99 are in identical shape, so that the convenience of processing the notches 99 and the consistency of the processing procedures can be beneficially improved, and the difficulty in processing and manufacturing the top cover 32 or the casing 31 can be reduced. The notches 99 are evenly arranged on the inserting portion 321 or the end portion 311 of the casing 31 along a circumferential direction Y of the opening 31b.

Figure 8:
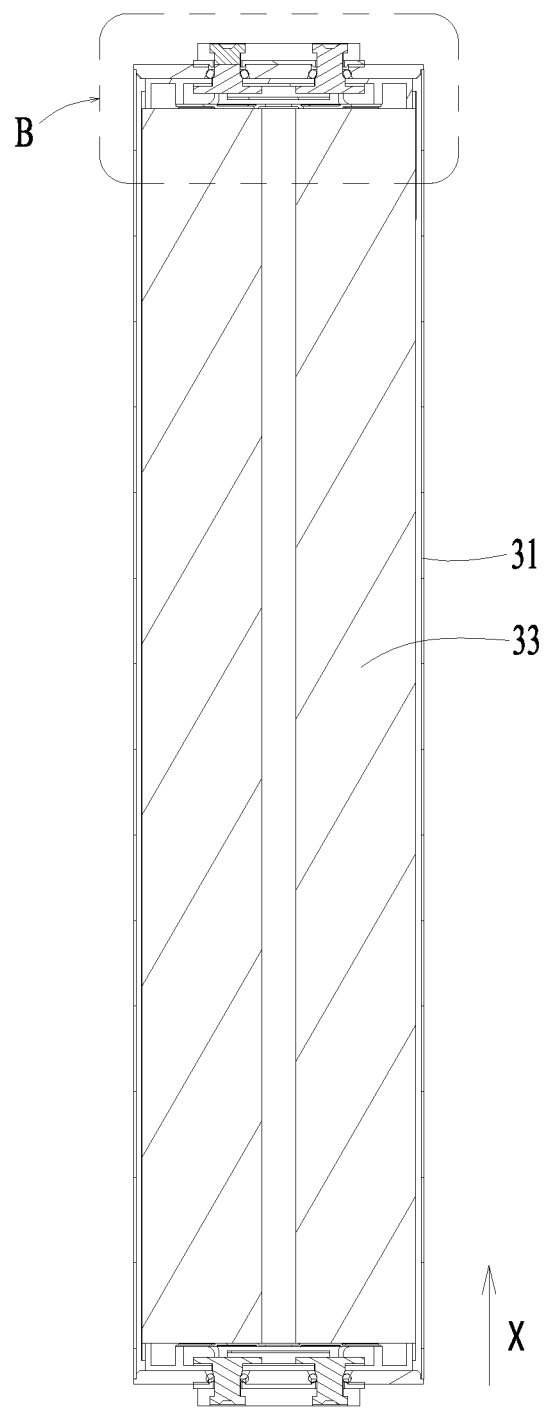
FIG. 8 is a schematic cross-sectional structure view of a secondary battery disclosed according to an embodiment of the present disclosure.
Figure 9:
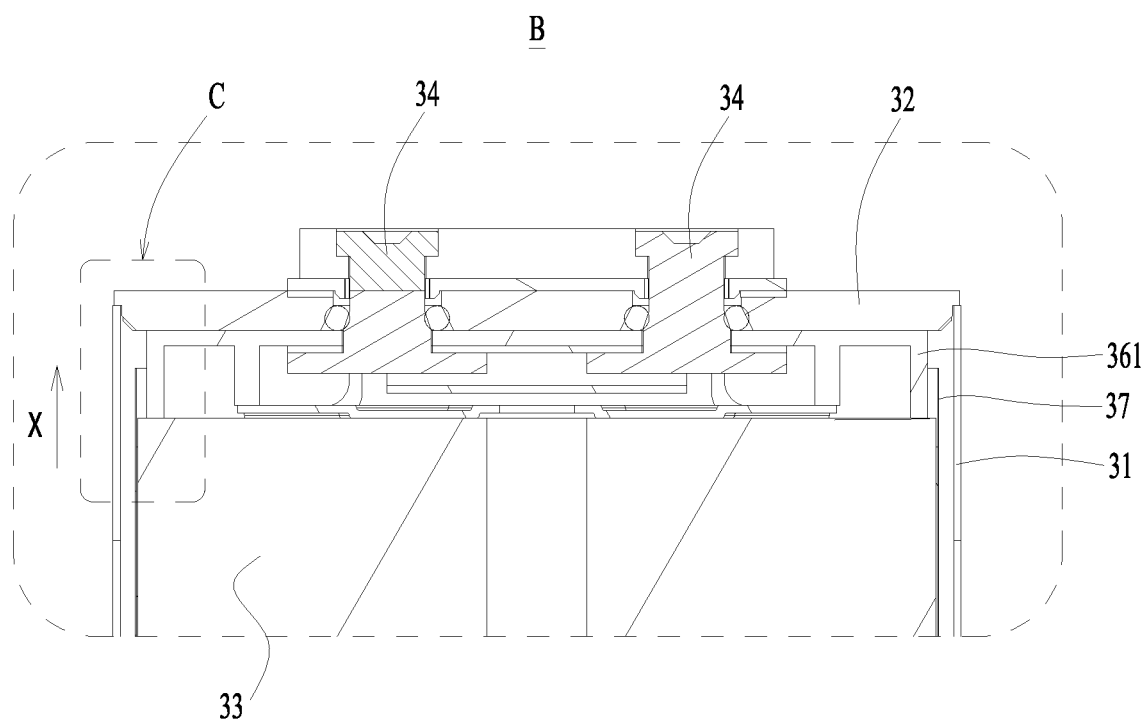
FIG. 9 is an enlarged view of portion B in FIG. 8.

In an embodiment, with reference to FIGS. 4, 8 and 9, the secondary battery 30 further includes an insulating member 36. The insulating member 36 is installed on the top cover 32 to isolate the top cover 32 from the electrode assembly 33. One end of the insulating member 36 away from the top cover 32 is pressed against the electrode assembly 33, so as to limit the position of the electrode assembly 33 and reduce the play of the electrode assembly 33 in the casing 31 along the axial direction X of the opening 31b of the casing 31. An axial direction X of the opening 31b is the same as an axial direction of the receiving hole 31a. Optionally, the insulating member 36 is made of an insulating material such as rubber, plastic, or the like. In one example, a maximum distance between adjacent notches 99 determines a maximum size of the wire-like metal debris. The maximum distance between the adjacent notches 99 may be the maximum size measured along the circumferential direction Y of the opening 31b. A minimum thickness of the insulating member 36 protruding out from the top cover 32 along the axial direction X of the opening 31b is greater than the maximum distance between the adjacent notches 99, so that the minimum thickness of the insulating member 36 protruding out from the top cover 32 along the axial direction X of the opening 31b is greater than the maximum size of the wire-like metal debris that can be produced between the top cover 32 and the casing 31; thereby the wire-like metal debris is not prone to go in between the insulating member 36 and the electrode assembly 33, and therefore, the possibility of short circuit occurring at the first electrode plate and the second electrode plate can be reduced which is caused by the overlapping of the wire-like metal debris with the first electrode plate and the second electrode plate of the electrode assembly 33. In another example, the maximum thickness of the inserting portion 321 along the axial direction X of the opening 31b determines the maximum size of the wire-like metal debris along the axial direction X of the opening 31b. The minimum thickness of the insulating member 36 protruding out from the top cover 32 along the axial direction X of the opening 31b is greater than the maximum thickness of the inserting portion 321 of the top cover 32 along the axial direction X of the opening 31b, so that the minimum thickness of the insulating member 36 protruding out from the top cover 32 along the axial direction X of the opening 31b is greater than the maximum size of the wire-like metal debris that can be produced between the top cover 32 and the casing 31 along the axial direction X of the opening 31b; thereby, the wire-like metal debris is not prone to enter between the insulating member 36 and the electrode assembly 33, and therefore, the possibility of short circuit occurring at the first electrode plate and the second electrode plate can be reduced which is caused by the overlapping of the wire-like metal debris with the first electrode plate and the second electrode plate of the electrode assembly 33. Optionally, the minimum thickness of the insulating member 36 protruding out from the top cover 32 along the axial direction X of the opening 31b is greater than the maximum distance between the adjacent notches 99, and the minimum thickness of the insulating member 36 protruding out from the top cover 32 along the axial direction X of the opening 31b is greater than the maximum thickness of the inserting portion 321 of the top cover 32 along the axial direction X of the opening 31b.

Figure 10:
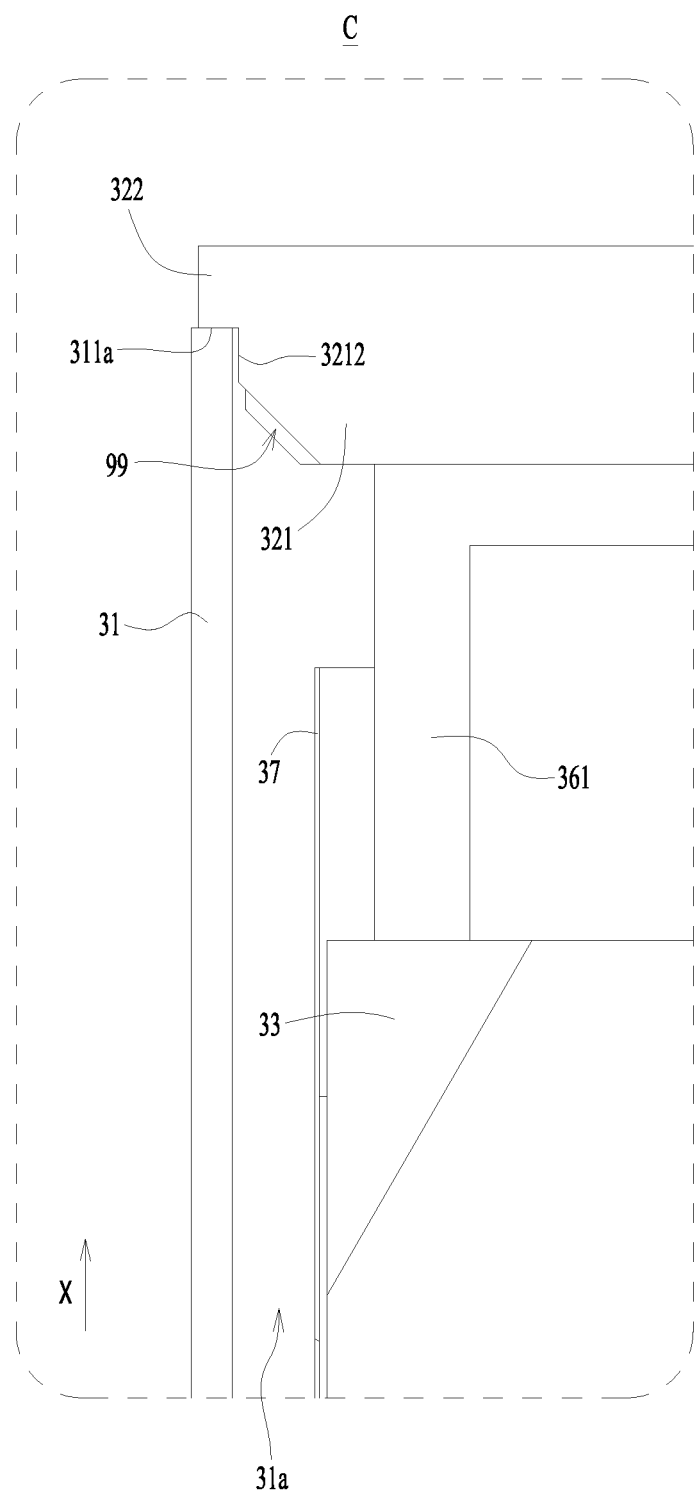
FIG. 10 is an enlarged view of portion C in FIG. 9.

In one example, with reference to FIG. 10, the insulating member 36 includes a ring portion 361 disposed around an edge of the inserting portion 321. The secondary battery 30 includes an insulating sheet 37 for wrapping the electrode assembly 33. The insulating sheet 37 is wound along the circumferential direction Y of the opening 31b to form a cylindrical structure. The insulating sheet 37 extends to a position between the ring portion 361 and the casing 31. A part of the insulating sheet 37 located between the ring portion 361 and the casing 31 can protect from the wire-like metal debris, preventing beneficially the wire-like metal debris from entering between the insulating member 36 and the electrode assembly 33, and further reducing the possibility of short circuit occurring at the electrode assembly 33 resulting from the wire-like metal debris entering between the insulating member 36 and the electrode assembly 33.

In an embodiment, with reference to FIGS. 7 and 10, the top cover 32 further includes a disc portion 322. The inserting portion 321 protrudes from an end surface of the disc portion 322 facing the electrode assembly 33. A diameter of the disc portion 322 is greater than a diameter of the inserting portion 321. An outer edge of the disc portion 322 extends out from the inserting portion 321, to connect and fix with the end portion 311 of the casing 31. The disc portion 322 of the top cover 32 is sealingly connected with the end portion 311 of the casing 31. In an example, the disc portion 322 of the top cover 32 and the end portion 311 of the casing 31 are connected and fixed by welding. Optionally, the welding may be laser welding or hot melt welding.

In one embodiment, with reference to FIG. 10, the notches 99 are disposed on the inserting portion 321 of the top cover 32. The inserting portion 321 has an annular surface 3212 connected with the disc portion 322. The notches 99 are disposed on a side of the annular surface 3212 away from the disc portion 322. Along a radial direction of the opening 31b, the end portion 311 of the casing 31 has an end surface 311a corresponding to the annular surface 3212 of the inserting portion 321 in terms of position. The radial direction of the opening 31b is perpendicular to the axial direction X of the opening 31b. Along the radial direction of the opening 31b, an orthographic projection of the end surface 311a of the end portion 311 is located within an orthographic projection of the annular surface 3212. In the embodiment where the disc portion 322 and the end portion 311 of the casing 31 are connected and fixed by laser welding, a part of the inserting portion 321 corresponding to the annular surface 3212 can block the laser light, reducing beneficially the possibility of structural damage to the electrode assembly 33 or other structural members resulting from the laser light emitting into the casing 31 or irradiating the electrode assembly 33 or other structural members.

Figure 11:
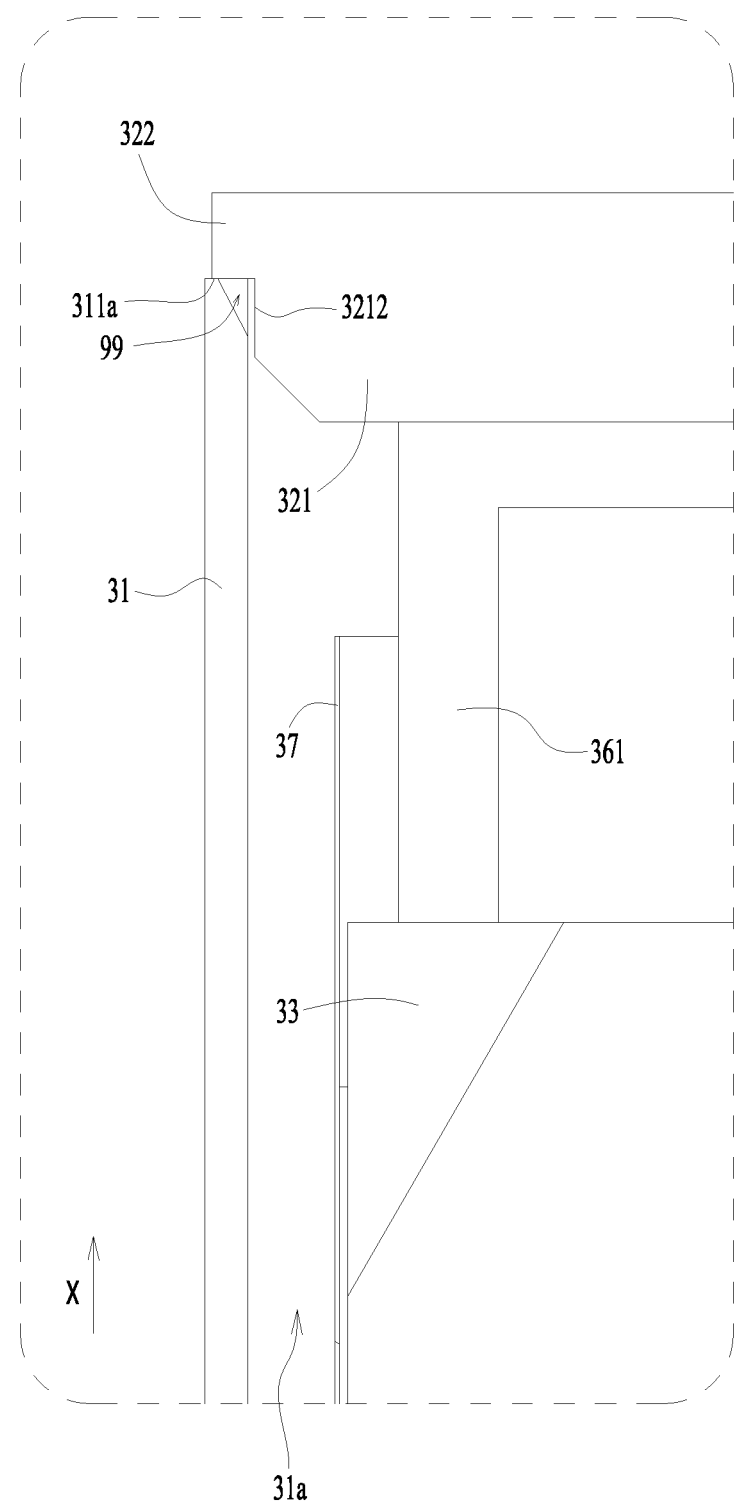
FIG. 11 is a schematic partial cross-sectional structure view of a secondary battery disclosed according to another embodiment of the present disclosure.

In one embodiment, as shown in FIG. 11, the notches 99 are disposed on the inner side of the end portion 311. A size of the notch 99 along the axial direction X of the opening 31b is smaller than a thickness of the inserting portion 321 inserted into the opening 31b. After the inserting portion 321 is inserted into the casing 31, the inserting portion 321 can cover the entire notch 99, so that the metal slag produced when the disc portion 322 of the top cover 32 and the end portion 311 of the casing 31 are welded and connected is not prone to fall into the casing 31 from the notch 99, reducing beneficially the possibility of short circuit occurring at the first electrode plate and the second electrode plate resulting from the metal slag piercing the separator of the electrode assembly 33.

The secondary battery 30 according to the embodiment of the present disclosure includes the casing 31 and the top cover 32 connected and fixed with the casing 31. The plurality of notches 99 are provided on the inner side of the end portion 311 of the casing 31 or the side wall 3211, facing the casing 31, of the inserting portion 321 of the top cover 32. Since the notches 99 are disposed on the inner side of the end portion 311 of the casing 31 or the side wall 3211, facing the casing 31, of the inserting portion 321 of the top cover 32, the region where the top cover 32 and the casing 31 are in contact with each other becomes smaller during the assembly process, so that the region where the inserting portion 321 and the casing 31 come into scratching becomes smaller; therefore, a smaller number or smaller size of wire-like metal debris can be produced during the assembly process of the casing 31 and the top cover 32, effectively reducing the possibility of short circuit occurring between the first electrode plate and the second pole of the secondary battery 30 due to the overlapping with the wire-like metal debris, and improving the operational safety of the secondary battery 30.

Although the present disclosure has been described with reference to the optional embodiments, various modifications may be made thereto and components thereof may be replaced with equivalents without departing from the scope of the present disclosure. In particular, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A secondary battery comprising:
   a casing comprising an end portion provided with an opening; and
   a top cover for covering the opening of the casing, the top cover comprising an inserting portion extending into the casing from the opening,
   wherein a plurality of notches are provided on a side wall of the inserting portion facing the casing,
   wherein the secondary battery further comprises an insulating member and an electrode assembly installed within the casing, the insulating member is installed on the top cover to isolate the top cover from the electrode assembly; and
   wherein the insulating member comprises a ring portion disposed around an edge of the inserting portion, the secondary battery further comprises an insulating sheet for wrapping the electrode assembly, and the insulating sheet extends to a position between the ring portion and the casing.

2. The secondary battery according to claim 1, wherein, a minimum thickness of the insulating member protruding out from the top cover along an axial direction of the opening is greater than a maximum distance between adjacent notches; and/or, the minimum thickness of the insulating member protruding out from the top cover along the axial direction of the opening is greater than a maximum thickness of the inserting portion along the axial direction of the opening.

3. The secondary battery according to claim 1, wherein at least part of the side wall of the inserting portion has a smooth curved surface or an inclined surface inclined toward a center of the opening.

4. The secondary battery according to claim 1, wherein the plurality of notches are in identical shape.

5. The secondary battery according to claim 1, wherein the plurality of notches are evenly arranged on the inserting portion along a circumferential direction of the opening.

6. The secondary battery according to claim 1, wherein the top cover further comprises a disc portion, the inserting portion protrudes out from an end surface of the disc portion, and an outer edge of the disc portion extends out from the inserting portion to connect and fix with the end portion.

7. The secondary battery according to claim 6, wherein the inserting portion has an annular surface connected with the disc portion, the notch is disposed on a side of the annular surface away from the disc portion, and an orthographic projection of an end surface of the end portion along a radial direction of the opening falls within the annular surface.

8. The secondary battery according to claim 6, wherein the disc portion is sealingly connected with the end portion of the casing.

9. The secondary battery according to claim 7, wherein the disc portion is sealingly connected with the end portion of the casing.

10. The secondary battery according to claim 6, wherein the disc portion and the end portion of the casing are connected and fixed by welding.

11. The secondary battery according to claim 7, wherein the disc portion and the end portion of the casing are connected and fixed by welding.

12. A battery module comprising:
    a housing;
    the secondary battery according to claim 1, the secondary battery being provided within the housing.

13. A device using a secondary battery as a power source, comprising:
    the secondary battery according to claim 1, the secondary battery being used to provide electrical energy.

* * * * *

UNITED STATES PATENT AND TRADEMARK OFFICE
CERTIFICATE OF CORRECTION

Page 1 of 1

PATENT NO. : 11,424,500 B2
APPLICATION NO. : 17/120593
DATED : August 23, 2022
INVENTOR(S) : Chengyou Xing et al.

It is certified that error appears in the above-identified patent and that said Letters Patent is hereby corrected as shown below:

On the Title Page

(73) Assignee:
Please delete "Contemporain Amperex Technology Co., Limited" and insert -- Contemporary Amperex Technology Co., Limited -- therefor.

Signed and Sealed this
Eleventh Day of October, 2022

Katherine Kelly Vidal
*Director of the United States Patent and Trademark Office*